United States Patent [19]

Tamano et al.

[11] Patent Number: 5,229,430
[45] Date of Patent: Jul. 20, 1993

[54] AMINE CATALYST FOR PRODUCING POLYURETHANE AND PROCESS FOR PRODUCING POLYURETHANE

[75] Inventors: Yutaka Tamano, Tokuyama; Masaki Ishida; Shuichi Okuzono, both of Kudamatsu, all of Japan

[73] Assignee: Tosoh Corporation, Shinnanyo, Japan

[21] Appl. No.: 979,262

[22] Filed: Nov. 20, 1992

Related U.S. Application Data

[62] Division of Ser. No. 737,697, Jul. 30, 1991.

[30] Foreign Application Priority Data

Jul. 30, 1990 [JP] Japan .................. 2-199268
Jul. 3, 1991 [JP] Japan .................. 3-188280

[51] Int. Cl.$^5$ .................. C08J 9/00; C08G 18/08
[52] U.S. Cl. ................. 521/129; 521/164; 528/49; 528/53
[58] Field of Search .......... 521/129, 164; 528/53, 528/49

[56] References Cited

U.S. PATENT DOCUMENTS

5,134,217  7/1992  Weider et al. ............. 521/129
5,162,386  11/1992  Coppola et al. ............ 521/129
5,173,516  12/1992  Vratsouos ................. 521/129

FOREIGN PATENT DOCUMENTS

0000389  1/1979  European Pat. Off. .
0285135  10/1988  European Pat. Off. .
1088708  3/1961  Fed. Rep. of Germany .
1569118  4/1970  Fed. Rep. of Germany .
2094784  9/1982  United Kingdom .

*Primary Examiner*—Morton Foelak
*Attorney, Agent, or Firm*—Oblon, Spivak, McClelland, Maier & Neustadt

[57] ABSTRACT

An amine catalyst for producing polyurethane comprising a compound of formula (I):

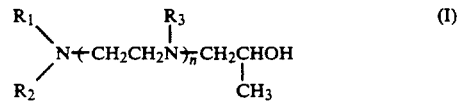

wherein n is an integer from 0 to 3, and $R_1$, $R_2$, and $R_3$ are each independently a $C_{1-3}$ alkyl group. The amine catalyst has a secondary hydroxyl group in the molecule and is non-bleeding in the polyurethane resin and excellent in moldability. A process for producing a polyurethane foam by reacting a polyol with a polyisocyanate in the presence of the amine catalyst defined above and a foaming agent are also disclosed.

7 Claims, No Drawings

AMINE CATALYST FOR PRODUCING POLYURETHANE AND PROCESS FOR PRODUCING POLYURETHANE

This is a division of application Ser. No. 07/737,697, filed on Jul. 30, 1991.

BACKGROUND OF THE INVENTION

1. Field of the Invention

The present invention relates to an amine catalyst for producing flexible, semi-rigid, and rigid polyurethane, or elastomer and the like of polyurethane. More particularly, the present invention relates to an amine catalyst which has a secondary hydroxyl group in the molecule and is non-bleeding in the polyurethane resin and excellent in moldability, to a process for the production of polyurethane using the catalyst and a polyurethane.

2. Discussion of the Background

Polyurethane foam, is usually produced from a polyol and a polyisocyanate containing catalyst, foaming agent (halogenated hydrocarbon and/or water), and if necessary, other auxiliary agents by instantaneously stirring and mixing them to promote foaming.

Polyurethane foam is advantageously used as material for various articles because of its light weight and excellence in cushioning property, anti-shock property, anti-vibration property, as well as other properties. Hitherto, as a catalyst for producing these polyurethanes, amine catalysts such as triethylamine, N-ethylmorpholine, triethylenediamine, tetramethylhexamethylenediamine, and the like have been employed to achieve good moldability of the foams. However, it is known that the use of these amine catalysts brings about various further problems when the catalysts are used in production. For example, when producing interior articles of automobiles such as instrument panels, seats, head rests, arm rests, and the like which are produced from polyurethane foam together with other materials such as, for example, polyvinylcholoride resin, ABS resin, polycarbonate resin, and the like, either in a combined form such as foil, coating, and border materials, or by being molded integratedly, with these materials, problems arise due to the interaction between the amine catalyst and the other materials. For example, an amine catalyst remaining in a polyurethane foam may migrate onto other materials in contact with the polyurethane foam to cause deterioration and discoloration of the other materials, and a reduction in the commercial value of the product.

So far, as solutions for these problems, the following processes have been proposed: a process employing an amine catalyst which has a reactive primary amino group or secondary amino group in the molecule (Japanese Laid-Open Patent Application No. Sho 46-4846, Japanese Laid-Open Patent Application No. Sho 59-191743, Japanese Patent Publication No. Sho 61-31727); a process employing an amine catalyst which contains a reactive primary hydroxyl group in the molecule (Japanese Patent Publication No. Sho 57-14762); and the like. These amine catalysts work to accelerate the formation reaction of a polyurethane foam, and at the same time react with the raw material polyisocyanate due to the presence of the reactive groups in the molecule and are incorporated into the polyurethane resin. Therefore, problems with the deteriorated physical property and discoloration of the resultant products can be avoided because the amine catalyst does not migrate to other materials in contact with polyurethane foam. But the amine catalysts having these reactive groups which are entrapped in the polyurethane resin lose their catalytic activity during the reaction, resulting in incomplete formation of the polyurethane resin. Thus, the problems of an increased percentage of rejected products having voids in the polyurethane foam and deteriorated moldability have been reported.

For production of an article from polyurethane foam either in combination with or molded integratedly with other materials, amine catalysts are desired which are non-bleeding so as not to deteriorate nor discolor the other materials which are brought into contact with the catalyst and, in addition, which are excellent in the moldability.

The present inventors continued comprehensive investigations on the amine catalyst for producing polyurethane and the method of production thereof.

As the result, the present inventors have found that an amine catalyst having a secondary hydroxyl group in the molecule shows non-bleeding in polyurethane resin, improved catalytic activity during the formation reaction of polyurethane, and does not deteriorate nor discolor other material contacting polyurethane foam when the catalyst is used for those products which are made from polyurethane foam by combining or molded integratedly with other material, and have completed the present invention.

SUMMARY OF THE INVENTION

Therefore, the present invention provides for amine catalysts which show non-bleeding in a polyurethane resin and which are used for producing polyurethane resin excellent in moldability, and also a process of production of polyurethane using the same.

The object of the present invention is provided for by an amine catalyst for producing polyurethane comprising a compound expressed by the following general formula (I)

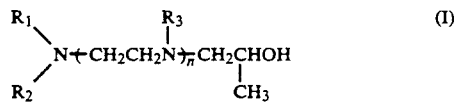

wherein n is an integer from 0 to 3, and $R_1$, $R_2$ and $R_3$ each independently represents a $C_{1-3}$ alkyl group and a process for producing polyurethane using the above mentioned catalyst.

Another embodiment of the present invention, provides for a polyurethane containing the above mentioned catalyst.

DETAILED DESCRIPTION OF PREFERRED EMBODIMENTS

The present invention will be explained in detail below.

The amine catalyst of the present invention is a tertiary amine compound having a secondary hydroxyl group in the molecule expressed by the general formula (I).

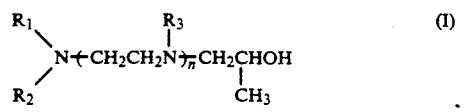

wherein n is an integer from 0 to 3, and $R_1$, $R_2$ and $R_3$ each independently represents a $C_{1-3}$ alkyl group.

The amine catalysts of the present invention include N,N-dimethyl-N-(2-hydroxypropyl)amine, N,N,N'trimethyl-N'-(2-hydroxypropyl)ethylenediamine, N,N,N',N''tetramethyl-N''-(2-hydroxypropyl)-diethylenetriamine, N,N,N',N'',N'''-penta-methyl-N'''-(2-hydroxypropyl)triethylenetetramine, and the like. Among these, more preferable are N,N-dimethyl-N-(2-hydroxypropyl)amine, N,N,N'-trimethyl-N'-(2-hydroxypropyl)ethylenediamine, and N,N,N',N''-tetramethyl-N''-(2-hydroxypropyl)diethylenetriamine.

These amine catalysts may be prepared according to a process which is known in the art. For example, the preparation may be performed by the Reuckart-Wallach reaction, as disclosed in U.S. Pat. No. 4,026,840 (the text of U.S. Pat. No. 4,026,840 is hereby incorporated by reference) starting from a corresponding alkanolamine, or by use of a reductive alkylation reaction as disclosed in West Germany Patent No. DE-2,618,580.

The amount of the amine catalyst according to the present invention needed for producing polyurethane is in the range of from 0.02 to 10 parts, more preferably 0.1 to 5 parts, by weight based on 100 parts of the polyol. In addition, other known tertiary amine catalysts, organic carboxylic acid salts thereof, and organo tin compounds which are usually used as co-catalysts may be employed as auxiliary catalysts so long as the proper catalytic function of the present invention is not lost. Among the substances referred to above, triethylenediamine may be preferably used because it does not impair the good moldability of the amine catalyst of the present invention and does not deteriorate nor discolor the materials which come into contact with the catalyst. Particularly desirable is the combined use of the amine catalyst (I) of the present invention and triethylenediamine (II) in a ratio ((I)/(II)) by weight being not less than 0.75 and not larger than 12. In the process for producing polyurethane using the amine catalyst of the present invention, polyols, polyisocyanates, and foaming agents, stabilizers, and if necessary, other auxiliary agents which are hitherto known, may be employed.

Polyols include polyetherpolyol, polymer polyols, and polyesterpolyols having 2 or more reactive hydroxyl groups. Polyetherpolyols include, for example, polyhydric alcohols such as glycol, glycerin, pentaerythritol, and sucrose; aliphatic amine compounds such as ammonia, and ethyleneamine; aromatic amine compounds such as toluene diamine, and diphenylmethane-4,4'-diamine; and/or a polyetherpolyol obtained by adding ethylene oxide or propylene oxide to a mixture of above-mentioned compounds. Polymer polyol is exemplified by a reaction product of said polyetherpolyol with ethylenic unsaturated monomer, such as butadiene, acrylonitrile, and styrene, the reaction being conducted in the presence of a radical polymerization catalyst. Polyesterpolyols include those which are produced from a dibasic acid and a polyhydric alcohol such as, for example, polyethyleneadipate and polyethyleneterephthalates which may include those products reclaimed from waste materials.

As for the polyisocyanate component, known organic polyisocyanates may be employed including, for example, aromatic polyisocyanates such as toluene diisocyanate, diphenylmethane-4,4'-diisocyanate, polymerized isocyanate thereof, and the like; aliphatic polyisocyanates such as hexamethylenediisocyanate and the like; alicyclic polyisocyanates such a isophoronediisocyanate and the like; pre-polymers with end isocyanate groups such as toluenediisocyanate pre-polymer and diphenylmethane-4,4'-diisocyanate pre-polymer which are obtained by the reaction of the above-mentioned substances with a polyol; denatured isocyanate such as carbodiimide denatured substances; and further mixed polyisocyanates thereof.

Foaming agents are exemplified by low boiling point halogenated hydrocarbons and/or water. Known halogenated methanes and halogenated ethanes may be used as halogenated hydrocarbons. Among them, preferably are chlorofluorocarbon compounds such as trichloro-monofluoromethane (R-11), dichlorotrifluoroethane (R-123), dichloromonofluoroethane (R-141b), and the like. The amount of the foaming agent to be used is not particularly limited, but the amount of chlorofluorocarbon to be used is usually not larger than 35 parts by weight, preferably 0 to 30 parts by weight, based on 100 parts of polyol, and the amount of water to be used is not less than 2.0 parts, preferably 3.0 to 20.0 parts. The stabilizer is selected, for example, from non-ionic surfactants such as organopolysiloxanepolyoxyalkylene copolymers, silicone-glycol copolymers, and the like, or a mixture thereof. The amount of the stabilizer is not particularly specified, but usually 0 to 2.5 parts by weight based on 100 parts by weight of polyol.

According to the present invention, other auxiliary agents may be added if necessary. They include flame retardants, coloring agents, fillers, oxidation-inhibitors, ultraviolet ray screening agents, and the like.

The polyurethane prepared by use of the amine catalyst of the present invention includes flexible foam, HR foam, semi-rigid foam, rigid foam, microcellular foam, elastomer, and the like which are prepared by the conventional known one-shot method, the pre-polymer method, and the like. Among these known processes, particularly preferable is the process for producing polyurethane foam by using a foaming agent which is processed in a combined form such as foil, coating, or border material, or by molding integratedly, with other materials. Said other materials referred to above include resins such as polyvinylchloride resin, ABS resin, polycarbonate resin, and the like, metals, glasses, and the like. Examples of applications of the product include interior articles of automobiles such as instrument panels, seats, head rests, arm rests, and door panels as well as packaging materials, and the like.

The amine catalyst of the present invention behaves as a catalyst of the non-bleeding type in the polyurethane resin because it has a secondary hydroxyl group in the molecule. Also it is excellent in moldability since it suffers little from decreases in the catalytic activity during the reaction of forming polyurethane compared with other reactive catalyst. The result is that the amine catalyst of the present invention, when used for the production of articles from polyurethane foam in combination with, or by being molded integratedly with other materials, provides products with a lower rate of forming poor quality products and without deteriorating and discoloring other materials which are brought into contact with the polyurethane.

Having generally described this invention, a further understanding can be obtained by reference to certain specific examples which are provided herein for purposes of illustration only and are not intended to be limiting unless otherwise specified.

EXAMPLES 1 TO 5 AND COMPARATIVE EXAMPLES 1 TO 5

In the procedure for preparing semi-rigid foams using the formulation of starting materials as indicated below, respective catalysts were used in Examples and Comparative Examples and foaming tests were conducted under predetermined foaming conditions. Estimation of moldability of the polyurethane foams formed and the discoloration test of vinyl chloride resin were carried out as indicated below. The Results are shown in Table 1.

a. Formulation

|  | Parts by weight |
|---|---|
| Polyol 1) | 100 |
| Water | 2.8 |
| Cross-linking agent 2) | 3.0 |
| Catalyst 3) | Varied |
| Isocyanate 4) | (NCO/OH = 1.05) |

1) Polyetherpolyol, OHV = 33 mgKOH/g (FA-703, made by Sanyo Chemical Industries Co. Ltd.)
2) Triethanolamine (made by Mitsui Toatsu Chemical Co. Ltd.)
3) Catalysts used and explanation of abbreviations of the catalysts
   DMPA; N,N-Dimethyl-N-(2-hydroxypropyl)amine
   TMAEPA; N,N,N'-Trimethyl-N''-(2-hydroxypropyl)ethylenediamine
   TMDTPA; N,N,N',N''-Tetramethyl-N''-(2-hydroxypropyl)diethylenetriamine
   DMAPA; N,N-Dimethyl(3-aminopropyl)amine
   BDMAPA; Bis(3-dimethylaminopropyl)amine
   TMAEEA; N,N,N'-Trimethylaminoethylethanolamine
   TEDA-L33; 33% solution of triethylenediamine in dipropyleneglycol (TEDA-L33 made by Tosoh Corporation.)
   TMHMDA; Tetramethylhexamethylenediamine (TOYOCAT-MR, made by Tosoh Corporation.)
4) Crude MDI with the concentration of NCO = 31.0% (MR-200 made by blippon Polyurethane Industry, Ltd.)

b. Foaming condition

| Temperature of starting material liquid | 25 ± 1° C. |
|---|---|
| Stirring speed | 6000 rpm (for 7 seconds) | c. Items of measurement

The starting materials for polyurethane were placed in a 2 liter cup made of polyethylene at the room temperature (20 to 25° C.) and foaming was performed. Reactivity, density of the foam, and moldability were measured.

Reactivity

| Cream time; | Time before the start of foaming (in seconds) |
|---|---|
| Gel time; | Time for resinification (in seconds) |
| Rise time; | Time before the foam reaches its maximum foaming height (in seconds) |

Density of foam

Density was measured of a test specimen prepared by cutting the central portion of the foam in a size 6 × 6 × 6 cm.

Moldability

Voids generated at the bottom portion of a foam formed were observed and rated in 3 grades:

| Large voids | X |
|---|---|
| Small voids | Δ |
| No voids | O |

Discoloration test

A starting material of polyurethane was poured onto a sheet of polyvinylchloride resin (GA-20, made by Plus-tech Co.) placed at the bottom of an aluminum mold (with the dimension of 12 × 50 × 2 cm) which was adjusted to 40° C., to prepare a test piece for the discoloration test. The specimen was heated to 120° C. in an oven, and the rate of discoloration after 200 hours was measured with a color meter (made by Nippon Denshoku Co.), to obtain the color difference value (ΔE; difference from the blank value).

TABLE 1

| | EXAMPLES | | | | | COMPARATIVE EXAMPLES | | | | |
|---|---|---|---|---|---|---|---|---|---|---|
| No. of Example | 1 | 2 | 3 | 4 | 5 | 1 | 2 | 3 | 4 | 5 |
| Catalyst | | | | | | | | | | |
| Abbreviation | DMPA | TMAEPA | TMDTPA | DMPA | TMAEPA | DMAPA | BDMAPA | TMAEEA | TEDA-L33 | TMHMDA |
| Parts (by weight) | 1.25 | 0.60 | 0.33 | 0.35 TEDA-L33 0.35 | 0.26 TEDA-L33 0.26 | 0.49 | 0.59 | 0.49 | 0.48 | 0.39 |
| Reactivity | | | | | | | | | | |
| Cream Time (in seconds) | 20 | 20 | 15 | 22 | 22 | 20 | 18 | 17 | 24 | 21 |
| Gel Time (in seconds) | 73 | 72 | 72 | 73 | 73 | 73 | 72 | 73 | 73 | 71 |
| Rise Time (in seconds) | 116 | 111 | 112 | 116 | 111 | 107 | 110 | 111 | 113 | 109 |
| Foam Density (kg/m$^3$) | 50.2 | 49.8 | 44.0 | 53.6 | 49.3 | 54.0 | 52.2 | 47.9 | 59.5 | 53.1 |
| Moldability (Estimation in 3 grades) | O | O | Δ | O | O | X | X | X | X | X |
| Discloration (ΔE) | 12.3 | 12.6 | 13.5 | 12.6 | 12.9 | 11.2 | 12.6 | 12.6 | 17.8 | 22.1 |

As clearly seen in Table 1, the amine catalyst of the present invention exhibited a small value of discoloration and further improved moldability. On the other hand, the amine catalysts in Comparative Examples 1 to 3 showed worse moldability, though the discoloration values were small, while the amine catalysts in Comparative Examples 4 and 5 additionally had large discoloration values. Thus, the catalysts in the Comparative Example could not be used.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A process for producing a semi-rigid polyurethane foam, comprising reacting a polyol with a polyisocyanate in the presence of a catalyst, a foaming agent, and other necessary auxiliary agents,
   wherein said catalyst comprises a compound of formula (I):

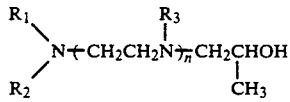

wherein $n = 0-3$ and $R_1$, $R_2$ and $R_3$ are each independently a $C_{1-3}$ alkyl group;
and triethylene diamine (II) in a weight ratio of (I)/(II) ranging from 0.75 to 12.

2. The process for producing a polyurethane foam according to claim 1, further comprising molding and processing said polyurethane foam in combination with or integratedly with another material.

3. The process for producing a polyurethane foam according to claim 1, wherein the foaming agent is selected from the group consisting of water and a halogenated hydrocarbon or a mixture thereof.

4. The process for producing a polyurethane foam according to claim 2, wherein said other material is selected from the group consisting of polyvinylchloride resin, ABS resin, and polycarbonate resin or a mixture thereof.

5. A polyurethane comprising the reaction product of a polyol with a polyisocyanate and an amine catalyst wherein said amine catalyst is an amine of the formula (I):

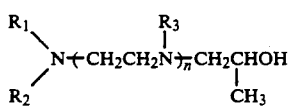

wherein, n is an integer from 0 to 3, and $R_1$, $R_2$, and $R_3$ are each independently a $C_{1-3}$ alkyl group.

6. The polyurethane according to claim 5, wherein the polyurethane is a foam.

7. The process for producing a polyurethane foam according to claim 2, wherein the foaming agent is selected from the group consisting of water and a halogenated hydrocarbon or a mixture thereof.

* * * * *